Sept. 7, 1937.  J. A. REYNOLDS  2,092,357
ANIMAL TRAP
Filed April 8, 1936
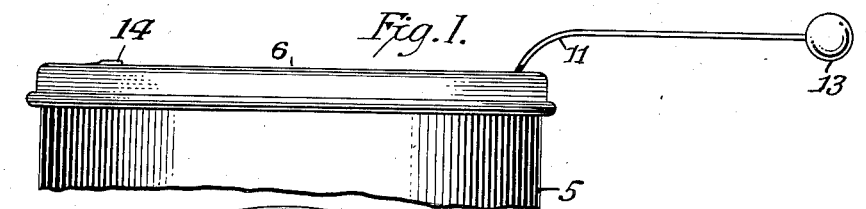
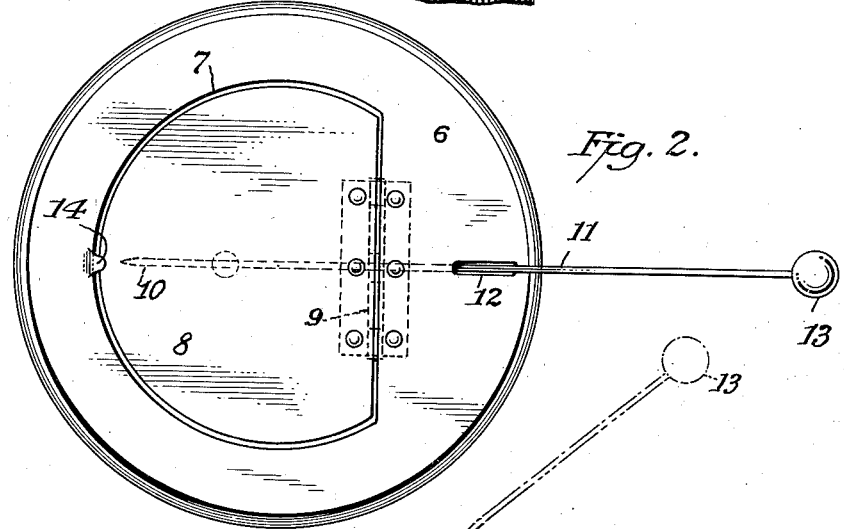
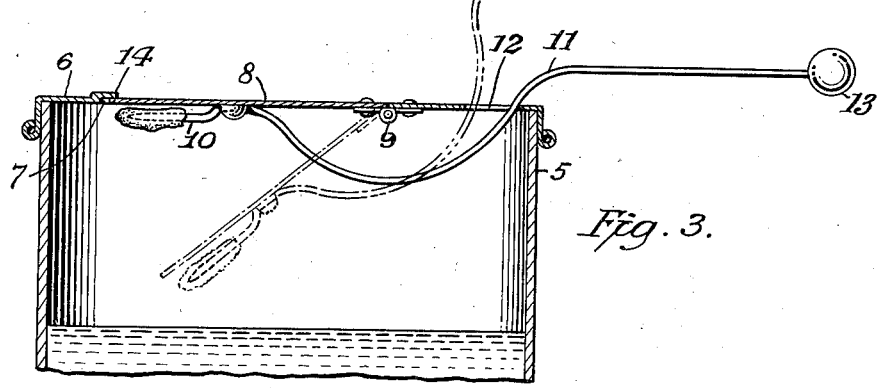
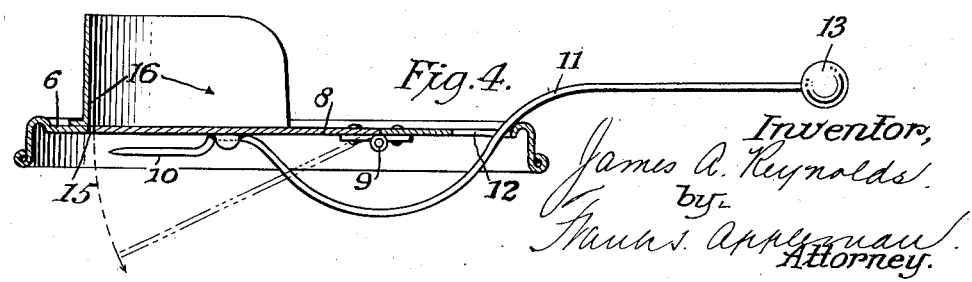
Inventor,
James A. Reynolds
by
Thomas Appleman
Attorney.

Patented Sept. 7, 1937

2,092,357

UNITED STATES PATENT OFFICE 2,092,357

ANIMAL TRAP

James A. Reynolds, Pine Bluff, Ark.

Application April 8, 1936, Serial No. 73,333

1 Claim. (Cl. 43—69)

This invention relates to hunting and trapping, and particularly to a class thereunder known as animal traps, and specifically, the invention relates to a trap of the so-called "tilting table" type.

It is an object of this invention to provide an animal trap primarily for use in trapping rats and mice, and the proportions of the trap will be determined by the specific use for which it is intended.

It is a further object of this invention to provide an element which may be employed as a cover for a receptacle into which the trapped animal will be confined against accidental release, after the trap has operated to cause the animal to fall into the receptacle. Since any particular type of receptacle may be employed, the invention relates more particularly to the trapping instrumentality associated with the cover of the receptacle and hence, under certain conditions, the cover and trapping instrumentality associated therewith may be commercialized as an article of manufacture which itself can be applied to any appropriate receptacle, such as a metal barrel, can of appropriate size, or other holder which is not subject to attack by gnawing of the trapped animal.

It is a still further object of this invention to provide an apertured cover, lid, or the like, the aperture of which is guarded by a sectional top or lid hinged to guard the opening of the cover and in a manner that the weight of the animal seeking the bait will cause the closure or lid to swing downwardly to unguard the opening so that the animal may fall into a receptacle to which the cover has been applied; and it is furthermore an object of this invention to provide novel means for guarding the bait from being devoured or fouled by the animal, as it is well known that some animals shun traps in which the bait has been affected by the presence of other animals.

It is a still further object of this invention, therefore, to provide a tiltable trap in which the bait is inaccessible to the animal approaching or entering the trap and therefore the bait holding instrumentality cannot afford a means by which the action of the trap can be forestalled, since there are no projecting parts forming anchorages for the claws of the animal after he loses his balance, due to the swinging action of the trapping element.

Furthermore, the concealed bait has all of the qualities for attracting the animal to explore the area where the bait is concealed and, in doing so, finds his way to that part of the trap in which his weight causes the trapping element to swing downwardly and, since there is nothing to which he can leap or cling, he must of necessity fall into the receptacle, and thereafter the arrangement of the trap is such that the weight returns the trap to normal position.

It is a still further object of the invention to provide a trap of the character indicated which will be self-setting and which comprises comparatively few, inexpensive parts which will prove efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation of a fragment of a receptacle with a cover having the trapping means applied thereto;

Figure 2 illustrates a detail view of the trapping instrumentality;

Figure 3 illustrates a sectional view embodying a modified construction; and Figure 4 illustrates a fragment of a modified embodiment of the invention.

In the drawing, 5 denotes a receptacle and 6 a lid or cover therefor having an aperture 7 which, in the present embodiment of the invention, has one straight edge and the remainder of the opening is curved. A tiltable closure 8 for the opening is mounted on a hinge 9, one leaf of which is secured to the underside of the cover and the other leaf of which is secured to the underside of the closure for the opening, but any other appropriate means may be provided for oscillatively mounting the tiltable closure so that it will swing under the influence of the weight of the animal occupying it.

On the underside of the closure, a bait hook or pin 10 is secured to the said closure and it is in slightly spaced relation to the closure so that the bait can be impaled on it in close proximity to the edge of the closure remote from the hinge. The bait holder is formed preferably as a part of an arm 11 which is shaped into a curve, the radius of which is approximately equal to the distance between the location of the anchorage of the arm with the closure. The curved arm projects through a slot 12 in the cover and moves therethrough as the closure oscillates under the influence of the weight of the animal occupying the upper surface of the closure, or under the influence of a weight 13 which is applied to the outer end of the arm, which weight is just sufficient to counterbalance the closure in order that it will be operative to hold the closure level with the upper surface of the lid. Even though the weight may serve to overcome the weight of the closure, the oscillatory movement of the lid will be limited by a lug or arresting member 14 located on the lid at the edge of the opening remote from the hinge, so that after the animal has been trapped, the closure will return to normal operative position and be retained by the action of the weight and the arresting device.

In the modification, the lid is provided with an opening 15 without the marginal surface of the cover being present. By having the opening so positioned, there is no ledge or support to which the animal might jump when the sinking sensation, due to the movement of the cover, takes place, and furthermore, by having a protecting shield 16 in upstanding position around a portion of the edge of the opening, the animal cannot find hold or support which will prevent his sliding down the closure as it tilts under his weight.

I claim:

In an animal trap, a lid for a trapping receptacle, the said lid having an aperture, a closure for the aperture, means for oscillatively mounting the closure on the lid to guard the opening, a bait anchor on the underside of the closure at the edge thereof remote from the means for mounting the closure, an arm secured to the under surface of said closure, the said lid having a slot on the side of the means for oscillatively mounting the closure opposite the side thereof at which the bait anchor is located, the said arm being curved downwardly between the end anchored to the closure and its end remote therefrom and under the means for oscillatively mounting the closure, the said curved arm projecting through the slot to a location above and beyond the lid when in normal position and terminating in a counterweight for the said lid.

JAMES A. REYNOLDS.